US012806970B2

(12) United States Patent
Massey et al.

(10) Patent No.: US 12,806,970 B2
(45) Date of Patent: *Nov. 24, 2026

(54) FILTER ADAPTABLE FOR USE IN AN HVAC SYSTEM

(71) Applicant: Groove Technologies, LLC, Houston, TX (US)

(72) Inventors: Fred Massey, Round Top, TX (US); Owen Massey, Round Top, TX (US)

( * ) Notice: Subject to any disclaimer, the term of this patent is extended or adjusted under 35 U.S.C. 154(b) by 311 days.

This patent is subject to a terminal disclaimer.

(21) Appl. No.: 18/677,098

(22) Filed: May 29, 2024

(65) Prior Publication Data

US 2024/0391301 A1 Nov. 28, 2024

Related U.S. Application Data

(63) Continuation-in-part of application No. 18/623,176, filed on Apr. 1, 2024, which is a continuation-in-part of application No. 18/322,060, filed on May 23, 2023, now Pat. No. 11,945,286.

(51) Int. Cl.

| | |
|---|---|
| ***B60H 3/06*** | (2006.01) |
| ***B01D 39/16*** | (2006.01) |
| ***B01D 46/10*** | (2006.01) |
| ***B01D 46/88*** | (2022.01) |

(52) U.S. Cl.

CPC ........... *B60H 3/0616* (2013.01); *B01D 46/10* (2013.01); *B01D 46/88* (2022.01); *B01D 39/1676* (2013.01); *B01D 2275/203* (2013.01); *B01D 2275/205* (2013.01); *B01D 2275/403* (2013.01); *B01D 2279/50* (2013.01); *Y10T 428/15* (2015.01)

(58) Field of Classification Search

None

See application file for complete search history.

(56) References Cited

U.S. PATENT DOCUMENTS

| | | | | |
|---|---|---|---|---|
| 4,889,542 | A * | 12/1989 | Hayes | B01D 46/10 D23/209 |
| 5,192,346 | A | 3/1993 | Kowalczyk | |
| 6,019,676 | A | 2/2000 | Kim | |
| 7,083,514 | B1 | 8/2006 | Stamey, Jr. | |
| 8,075,658 | B2 | 12/2011 | Volkmer | |
| D692,595 | S * | 10/2013 | Calkins | D25/157 |
| 8,940,069 | B2 | 1/2015 | Haider | |
| 9,687,769 | B2 | 6/2017 | Mardall | |
| 9,744,673 | B1 * | 8/2017 | Gordon | B25B 5/04 |
| 9,964,078 | B2 | 5/2018 | Pham | |
| 10,328,377 | B2 | 6/2019 | Ferreira | |

(Continued)

*Primary Examiner* — Gabriel E Gitman

(74) *Attorney, Agent, or Firm* — Egbert, McDaniel & Swartz, PLLC

(57) ABSTRACT

A filter for an HVAC system has a body formed entirely of an air-transmissive open-cell polymeric material. The body is of a generally rectangular configuration. The body has a plurality of cuts extending entirely through a thickness of the body from the top to the bottom of the body. The plurality of cuts define a plurality of cubical members frangibly connected together such that each of the plurality of cubical members is separable by hand from a remainder of the body such that an individual cubical member is removable along both a portion of a length and a portion of a width of the body.

20 Claims, 4 Drawing Sheets

(56) References Cited

U.S. PATENT DOCUMENTS

| | | | | |
|---|---|---|---|---|
| 11,945,286 | B1 * | 4/2024 | Massey ............. | B01D 39/1676 |
| 12,521,661 | B1 * | 1/2026 | Torbenson ......... | B01D 46/0005 |
| 2016/0280046 | A1 | 9/2016 | Williams | |
| 2016/0296870 | A1 * | 10/2016 | Mckechnie, IV ... | F24C 15/2035 |
| 2017/0001135 | A1 | 1/2017 | Paramore | |
| 2017/0368490 | A1 | 12/2017 | Wall | |

* cited by examiner

FILTER ADAPTABLE FOR USE IN AN HVAC SYSTEM

CROSS-REFERENCE TO RELATED APPLICATIONS

The present application is a continuation-in-part of U.S. patent application Ser. No. 18/623,176, filed on Apr. 11, 2024. U.S. patent application Ser. No. 18/623,176 is a continuation-in-part of U.S. patent application Ser. No. 18/322,060, filed on May 23, 2023, which issued as U.S. Pat. No. 11,945,286 on Apr. 2, 2024

BACKGROUND OF THE INVENTION

The present invention relates to filters for HVAC systems. More particularly, the present invention relates to filters that reduce or remove dust, pollens, and hazardous contaminants. The present invention also relates to those filters that are used for the removal of odors, such as smoke, food and pet odors. More particularly, the present invention relates to air filters that are adaptable for installation into an HVAC system.

In conventional HVAC systems, it is desirable to purify the air that passes through the HVAC system. The purification of this air is carried out by suitable air filters. For example, particle filters, odor-eliminating filters or their combinations are suitable for this purpose. The filter should remove or absorb as much as possible of suspended solids, particles and odors contained in the ambient air. Such filters for filtering air within HVAC systems are generally known in a variety of configurations.

An air filter for HVAC system typically is a pleated-paper filter or fiber filter that is placed in an air intake or exhaust of the HVAC systems. These air filters are uniquely shaped to fit within the available space within the HVAC system. This filter can greatly affect the effectiveness of the air conditioning and heating performance of the HVAC system. Clogged or dirty air filters can significantly reduce airflow through the HVAC system, as well as to allow allergens and contaminants to enter into the interior areas serviced by the HVAC system. A drawback to conventional air filters in such HVAC systems is that, although many believe such air filters to be generally highly efficient, conventional filters for HVAC systems have a relatively low Minimum Efficiency Reporting Value (MERV). As such, typical filters used in HVAC systems can allow the passage of airborne molecular contaminants and volatile organic compounds.

FIG. 1 shows a typical HVAC air filter 10 of the prior art. This typical air filter is formed of a paper material 12 that is folded into pleats and received within a frame 14. The size of the pleats and the distance between adjacent pleats are configured to maximize the filtering ability and airflow characteristics of the air filter 10. The frame 14 will have a particular size to fit within the HVAC system. Currently, HVAC systems have a wide variety of sizes. As such, it is important that the size of the frame 14, and the included pleated air filter 12, properly fit within the HVAC system so as to avoid air leakage therearound. As such, the air filter 10 must be provided in a wide range of sizes.

FIG. 2 shows how the air filter 10 can be installed within the HVAC system 16. The HVAC system 16 includes a fan 18 and a housing 20. The filter 10 will be interposed between the housing 20 and the fan 18. As such, the filter 10 can be in this position so that contaminants passing through the vents 22 of housing 20 can flow through the filter 12 and outwardly by way of the fan 18. Alternatively, if the fan 18 is directing air flow through the filter 10, the filter 10 prevents contaminants from passing outwardly through the vents 22 of the housing 20.

Unfortunately, this configuration of the air filter 10 has a large number of drawbacks. For the supplier such air filters, a wide variety of sizes of such air filters must be maintained in stock. This creates large inventory problems for the supplier. The wide range of different sizes of the housing 20 or the interior of the HVAC system, necessitates that many different sizes of air filters remain in stock. Many times, an improperly-sized air filter is positioned within the HVAC system. An improperly-sized air filter will either not fit within the housing 20 or will improperly fit so as to allow air flow to pass therearound and remain unfiltered. The ability of such an air filter 10 to filter the air often depends upon the length of time in which the air filter remains within the housing 12 or within the HVAC system. Over time, the pores in the pleated paper material 12 become clogged and the filtering efficiency is reduced. Often, it can come so clogged that it ineffectively removes pollutants and reduces operating efficiency. As such, a need has developed so as to provide such an air filter which is adaptable to a wide variety of HVAC system sizes and shapes.

There are currently other types of replacement filters on the market. However, these require measuring and cutting with tools in order to replicate the existing filter. This technique is very time-consuming. It also has the intrinsic liability of injuries.

In the past, various patents and patent application publications have issued with respect to such filters. For example, an early patent is that of U.S. Pat. No. 5,192,346, issued on Mar. 9, 1993 to T. Kowalczyk. This patent teaches an air purifier pleated filter that stops pollution. This pleated filter is installed in the plenum the heating-cooling system. The filter is equipped with a sensor switch that notifies the user whenever the filter becomes dirty and must be replaced. The filter includes a hot fluid heater, such as a hot water heater, which protects the filter from freezing and keeps the filter dry which stops bacteria from multiplying and prevents odors.

U.S. Pat. No. 6,019,676, issued on Feb. 1, 2000 to S. Kim, provides an air filtration method and device to more effectively clean the ambient air via the existing OEM ventilation and heating/air conditioning system. The air is treated instantly as it is being discharged and the filter is compatible with existing OEM air filtration processes that are provided.

U.S. Pat. No. 7,083,514, published on Aug. 1, 2006 to Stamey, Jr. et al., provides an air-filtration system for delivering air to a helmet. The air-filtration system comprises an air intake in the form of a scoop for drawing exterior air, an air duct assembly for delivering air from the air intake to the helmet, and an air filter assembly disposed in-line with the air duct assembly between the air intake and the helmet. The air filter assembly includes a catalyst member for converting carbon monoxide to carbon dioxide and a particulate filter member.

U.S. Pat. No. 8,075,658, issued on Dec. 13, 2011 to Volkmer et al., provides a filter element that has a zigzag-shaped fold pack of folds. At least one terminal element is folded parallel to the folds of the fold pack. The terminal element has a first leg, a second leg, and a third leg. The first leg is arranged substantially perpendicular to a flow direction of a medium flowing through the filter element. The first, second and third legs are determined by folds in the terminal element. The first and second legs are positioned substantially at right angles relative to one another. The third leg projects laterally away from the filter element to form a peripheral seal.

U.S. Pat. No. 8,940,069, issued on Jan. 27, 2015 to D. Haider, shows an air filter that has a fold pack having a first side. A material with a first leg and a second leg is disposed on the first side. The first leg is attached to the first side and the second leg has a width that is greater than a height of the fold pack. The material strip forms at least partially a head band or a side band of the fold pack. A filter receptacle for the interior air filter has a slanted wall and a mounting and removal opening through which the interior air filter is inserted or removed. The slanted wall extends at an angle that corresponds to an angle defined by the second leg of the material strip of the air filter and a contact surface of the filter receptacle.

U.S. Pat. No. 9,687,769, issued on Jun. 27, 2017 to Mardall et al., provides an air filtration system that includes a HEPA filter for filtering air from an air inlet into filtered air. The HEPA filter includes a fine particulate filter and a gas filter. Air passageways are formed in the vehicle and configured to convey air from the air inlet to the HEPA filter and to convey the filtered air from the HEPA filter.

U.S. Pat. No. 9,964,078, issued on May 8, 2018 to Pham et al., teaches a filter assembly for an air cleaner that includes a main filter, an auxiliary filter set apart from the main filter, and a filter mount fixed to and supporting the main filter and the auxiliary filter. The filter mount is fillable into and removable from the housing of the air cleaner. The filter mount includes a sealing element passing between the main filter and the auxiliary filter.

U.S. Pat. No. 10,328,377, issued on Jun. 25, 2019 to I. Ferreira, shows a filter having a relatively rigid support frame having top and bottom frame members and side frame members. A filter element is disposed within and supported by the frame for filtering a medium passing through the filter element. A pair of opposing members of the frame are bendable into an arch so as to allow the filter to be progressively inserted along an arched path into a filter housing. Opposing sides of the frame are provided with V-shaped notches to facilitate bending the filter into an arch for insertion.

U.S. Patent Application Publication No. 2016/0280046, published on Sep. 29, 2016 to Williams et al., shows an air filter that comprises a supportive frame configured to suitably orient the air filter within an air filtration system. The supportive frame comprises a shape and size suitable for supporting the air filter within the ventilation system. A filter medium is retained within the supportive frame and is configured to remove the airborne molecular contaminants and volatile organic compounds from air flowing through the ventilation system. The filter medium electrostatically attracts and agglomerates contaminants within the air flowing through the air filter.

U.S. Patent Application Publication No. 2017/0001135, published on Jan. 5, 2017 to R. Paramore, describes an air filter that is constructed from a washable and reusable material. This air filter is capable of being positioned within an air-conditioning and heating system and is capable of being washed while substantially maintaining its original shape.

U.S. Patent Application Publication No. 2017/0368490, published on Dec. 28, 2017 to J. J. Wall, teaches a compound air filter provided for sequestering airborne contaminants from air streamed through the air filter. The air filter includes a support frame having a shape and size suitable for setting the air filter within the air filtering system. The compound air filter is retained within the support frame. A first media layer of the compound filter medium is pleated with pleats and configured to exhibit a relatively high filtration efficiency at a low air pressure drop across the filter medium. A second media layer of the filter medium is coupled to the first media layer and configured to maintain a uniform distribution of the pleats within the first media layer.

U.S. Patent Publication No. 2016/0296870, published on Oct. 13, 2016 to McKechnie describes a vent filter and appliance utilizing such a filter. The vent filter is user-replaceable once it is been spent or its filtration capacity consumed. The filter is provided in or as part of a cartridge that can be reversibly installed and removed from an appliance without tools. A retention structure is provided for holding the filter media in place in a filter receptacle communicating with or formed as part of the exhaust duct of the appliance for the air to be filtered. The filter is configured as a recirculating filter to remove odor-causing contaminants, among other contaminants, from cooking fumes before the air from those fumes is recirculated into the kitchen or other ambient environment.

It is another object of the present invention to provide a filter for an HVAC system that is easy to install.

It is another object of the present invention to provide a filter for an HVAC system that requires less inventory of the filter assemblies.

It is another object of the present invention to provide a filter for an HVAC system that filters the air very effectively.

It is another object of the present invention to provide a filter for an HVAC system that is adaptable to a wide variety of receptacles or housings within the HVAC system.

It is another object of the present invention to provide a filter for an HVAC system that is flame retardant.

It is another object of the present invention to provide a filter for an HVAC system that provides superior filtration.

It is another object of the present invention to provide a filter for an HVAC system that requires no tools for installation.

It is still another object of the present invention to provide a filter for an HVAC system that can be installed within the housing or receptacle of the HVAC system in a very quick and easy manner.

These and other objects and advantages of the present invention will become apparent from a reading of the attached specification and appended claims.

SUMMARY OF THE INVENTION

The present invention is a filter that is adaptable for use in an HVAC system. This filter comprises a body formed entirely of an air-transmissive open-cell polymeric material. The body has a generally rectangular configuration. The body is a top, a bottom, a front, a back, and sides. The body has a plurality of cuts extending entirely through a thickness thereof from the top to the bottom. The plurality of cuts define a plurality of cubical members frangibly connected together such that each of the plurality of cubical members is separable by hand from a remainder of the body such that an individual cubical member of the plurality of cubical members is removable along both of a portion of a length and a portion of a width of the body. In the present invention, a plurality of cubical members are connected together by a segment of the air-transmissive open-cell polymeric material. The air-transmissive open-cell polymeric material is selected from the group consisting of foamed polyurethane, foamed polyester and foam polyether. In the preferred embodiment, the air-transmissive open-cell polymeric material is open-cell foamed polyurethane.

The top is planar and in parallel planar relationship to the bottom. The sides are planar and in planar parallel relation to corresponding opposite sides. The front is planar and in parallel planar relation to the back. Each of the plurality of cubical members has sides of approximately one inch square area. In the preferred embodiment, the body has a length of twenty-five inches, a width of the twenty-five inches and a thickness of one inch. The body is flexible and compressible. The body has no frame around the perimeter thereof and no support surface on either the top or the bottom thereof.

The present invention is also a method of installing a filter into an HVAC system. This method includes the steps of: (1) removing an existing filter from the HVAC system; (2) forming a body entirely of an air-transmissive open-cell polymeric material having a plurality of cubical members frangibly connected; (3) separating some of the plurality of cubical members from a remainder of the body until the body is of a size no less than the size of the existing filter such that an individual cubical member of the plurality of cubical members is separable along both of a portion of a length and a portion of the width of the body; and (4) inserting the body with the size no less than the size of the existing filter into the HVAC system. The step of forming the body includes cutting slits entirely through the body such that the plurality of cubical members are frangibly connected together. The cut slits extend lengthwise across the body and widthwise across the body so as to form the plurality of cubical members.

In the method of the present invention, some of the plurality of cubical members are broken by hand from adjacent cubical members until the body has a size approximating the existing filter. In order to obtain this size, the body is laid over the removed existing filter. Some of the plurality cubical members are removed until the body has a length and a width approximating a length and width of the removed existing filter. The body is formed of an open cell polyurethane material. The body is no frame around the periphery thereof nor a support surface on either the top or the bottom thereof. The body is a thickness equal to a thickness of the removed existing filter.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 3:
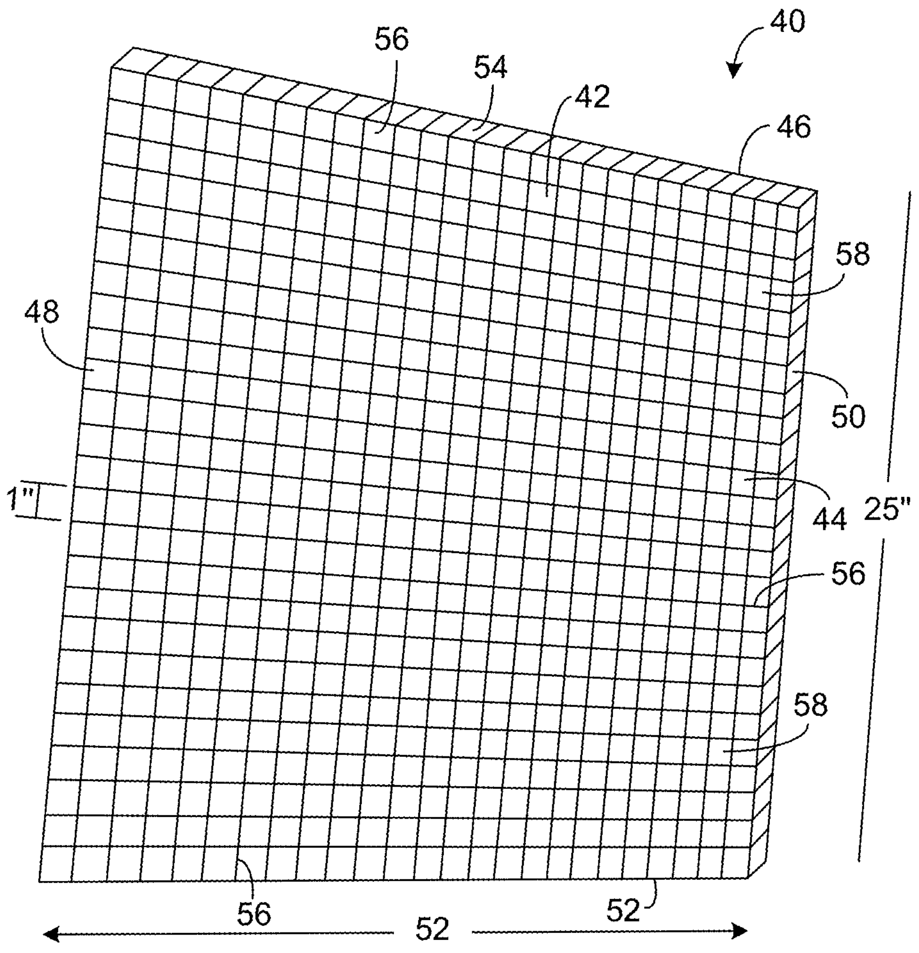
FIG. 3 is an upper perspective view showing the air filter of the present invention.

Referring to FIG. 3, there is shown the air filter 40 in accordance with the preferred embodiment of the present invention. The air filter 40 can have a wide variety of shapes and sizes. In particular, the air filter 40 includes a body 42 that is formed of an air-transmissive material. In the preferred embodiment of the present invention, this air-transmissive material is an open-cell foam material. This open-cell foam material can be selected from the group of foamed polyurethane, foamed polyether or foamed polyester (reticulated and non-reticulated). As can be seen, the body 42 has a generally rectangular configuration. In particular, the body has a top 44, a bottom 46, a pair of sides 48 and 50, a front 52, and a back 54. The body has a plurality of cuts 56 through a thickness thereof. This thickness is defined between the top 44 and the bottom 46. The plurality of cuts 56 define a plurality of cubical members 58 that are frangibly connected together.

As will be described hereinafter, the plurality of cubical members 58 are frangibly connected to each other by a segment or piece of the air-transmissive foam material. As such, the body 42 is held together in its generally rectangular configuration by the segments or pieces of the air-transmissive material.

The top 44 is in parallel planar relationship to the bottom 46. The pair of sides 48 and 50 are in parallel planar relationship to each other. The front 52 is in parallel planar relationship to the back 54.

In the preferred embodiment of the present invention, as can be seen in FIG. 3, for the purposes of being positioned within HVAC system, the body 42 will have a length of twenty-five inches and a width of twenty-five inches. The thickness of the body 42 is approximately one inch. This twenty-five inch×twenty-five inch×one inch configuration approximates the sizes of the maximum of most HVAC systems. In order to be installed with smaller HVAC systems, it is only necessary to remove the individual cubical members 58 along a column or row of the body 42 until the remaining portion of the body 42 approximates the size of the housing or receptacle of the HVAC system.

As can be seen in FIG. 3, the body 42 of the air filter 40 has no frame around the perimeter thereof and no support surface on either the top or the bottom thereof. As such, there is no structure that can interfere with the ability to individually hand-remove the cubical members from the remainder of the body. To the extent that the body 42 is slightly larger than the housing to which it is to be placed, the filter 40 is easily compressible and flexible so that it can be "squeezed" into the area of the housing or receptacle of the HVAC system. If there would be a frame around the periphery of the body 42, this frame would need to be remove in order to properly separate the cubical members from the remainder of the body 42. Any support surface on either the top 44 of the bottom 46 would interfere with the ability to hand-removed the individual cubical members. Any support surface on either the top 44 or the bottom 46 would also tend to interfere with the proper filtering of air through the HVAC system.

Figure 4:
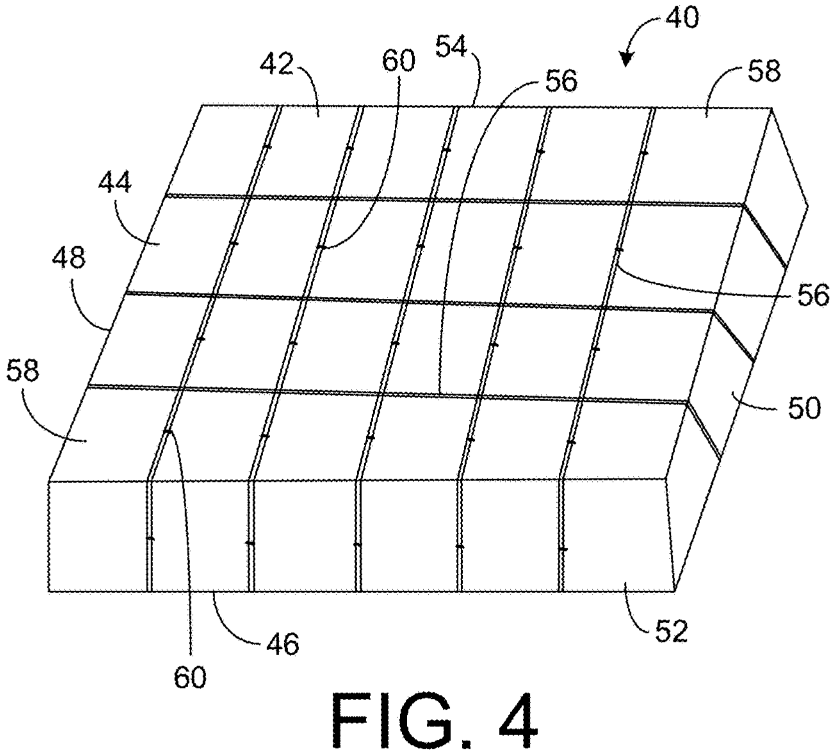
FIG. 4 is a perspective view showing details of the air filter of FIG. 3.

FIG. 4 further shows the filter 40 of the present invention. FIG. 4 shows a close-up view of a portion of the larger filter of FIG. 3. As can be seen, the air filter 40 includes the body 42 that is formed of the air-transmissive material. The body has a generally rectangular configuration with a top 44, the bottom 46, the pair of sides 48 and 50, the front 52 and the back 54. The plurality of cuts 56 extend through the thickness of the body. This thickness is defined between the top 44 and the bottom 46. The plurality of cuts 56 define the plurality of cubical members 58 that are frangibly connected together. Each of the cubical members will generally be a one-inch cube or a and/or having a one inch area on each side thereof.

The plurality of cubical members 58 are frangibly connected to each other by a segment or a piece of the air-transmissive foam material 60. As such, the body 42 is held together in its generally rectangular configuration by the segments or pieces of the air-transmissive material 60.

Each of the plurality of cubical members 58 are separable by hand from a remainder of the body 42. Preferably, each of the plurality of cubical members 58 has sides of one inch square area. For the purposes of fitting into the housing or receptacle of the HVAC system, these one-inch sides of the cubical members will allow the user to easily determine the proper size of the filter 42 insert within the HVAC system. For example, if the size of the OEM filter is 7"×9", then each of the cubical members 58 can be removed until it achieves the proper size.

The present invention is also applicable to fixed air-conditioning or heating systems, such as window unit air conditioners or heaters, mobile air purifiers and other systems that require an air filter. As such, the term "HVAC system" can include various varieties of stationary systems in industrial, commercial and residential use.

The body 42 can be shaped by removing the cubical members until the desired size is reached. Since the body 42 is a very large size, smaller HVAC systems can have several filters formed from a single body 42. In terms of inventory, the use of the relatively large bodies 42 allows the bodies to be stacked one upon another within a storage area. When a certain size of air filter is required, a person can take the body 42 and remove the cubical members 48 until the desired size is achieved. The remaining portion of the body 42 can be placed back into storage for future shaping. Since the body 42 has no frame around the periphery thereof, the shaping (by the separation of the cubical members 58 from adjacent cubical members) can be carried out in a quick and easy fashion.

The plurality of cuts 56 are achieved by cutting through the thickness of the body 42. In particular, there is a series of equally-spaced cuts formed lengthwise across the body and a series of equally-spaced cuts extending widthwise across the body 42. In the course of this cutting, a small segment of material 60 can be retained so that the cubical members 58 are frangibly secured together. As such, only a small force, by hand, allows the cubical members 58 to be separated from a remainder of the body 42. The step of cutting can be carried out by a knife, a slicer, or a laser.

Figure 5:
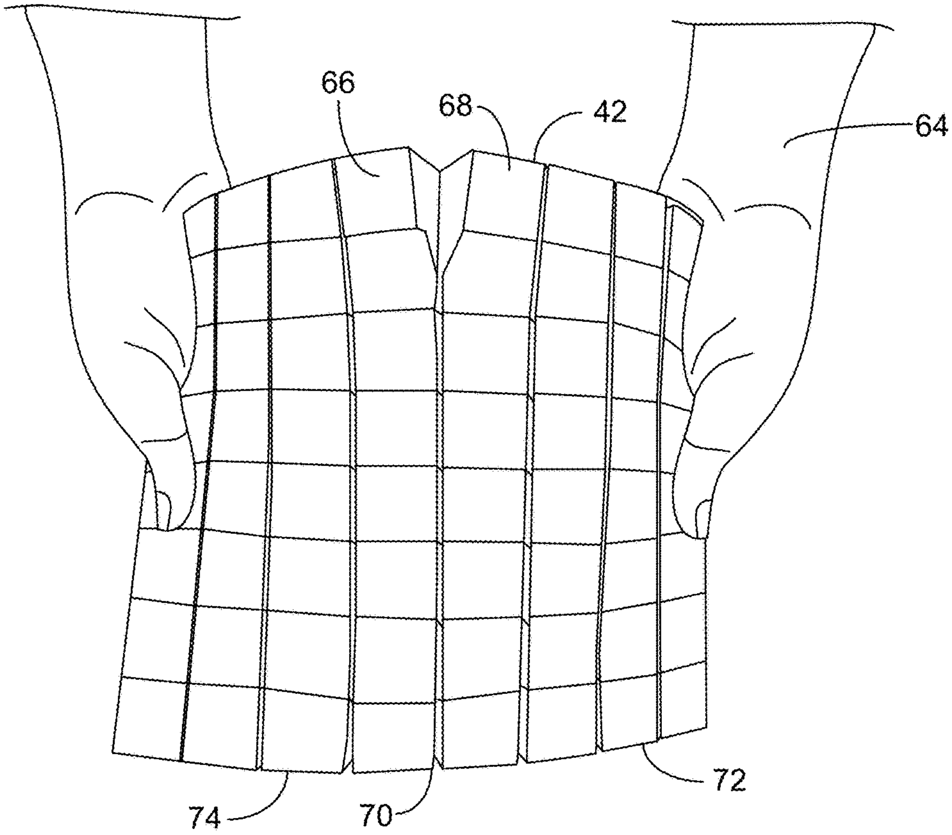
FIG. 5 is a plan view showing the separation of the cubical members of the air filter of the present invention for the purpose of sizing the filter to the HVAC system.

FIG. 5 shows this operation. In particular, in FIG. 5, it can be seen that the body 42 is grasped with the user's hands 60 and 64. The user's hands 64 act on the body 42 such that the cubical members 66 are separated from the cubical members 68. This will continue so that the cubical members along the line 70 continued to be separated from each other and an installable filter 72 is thereby formed. Installable filter 72 has a shape and size adapted to fit the housing or receptacle of the HVAC system. The remaining portion 74 can be placed back into storage for future use or discarded. The polymeric foam material used for the manufacture of the body 42 is flexible and compressible. Ultimately, the installable filter 72 should be no less than the size of the OEM filter. If it is slightly larger than the OEM filter, it is easily compressible so as to fit within the receptacle or housing of the HVAC system. This compressibility allows the filter of the present invention to be properly retained without the need for a frame or support surfaces in order to establish a secure and tight fit within the receptacle or housing of the HVAC system.

Experiments with the polyurethane foam material of the body 42 of the filter 40 of the present invention has shown superior particulate retaining capabilities. The particles are removed from the airflow while, at the same time, the airflow through the air-conditioning system is not impeded to any substantial degree. As such, the present invention has a proper Minimum Efficiency Reporting Value (MERV). The configuration of the shaped filter achieved by the present invention prevents the passage of airborne molecular contaminants and volatile organic compounds. In tests conducted with the filter 40 of the present invention, it was found that the MERV value is 11. As reference, the American Society of Heating, Refrigerating and Air-Conditioning Engineers has come up with the MERV value to measure air filter performance. Under MERV, air filters are rated on a scale of 1 to 16 (with 17 to 20 reserved for true HEPA filters). The higher the rating, the more thoroughly an air filter can capture airborne particles as small as 0.3 μm. For example, a MERV value of 1 to 4 will capture most types of dust, pollen and dust mites. A MERV value of 5-8 will capture most mold spores and pet dander. A MERV value of 9-12 will capture particles and *Legionella* bacteria. A MERV value 13 to 16 will capture all bacteria, most smoke, face powder and paint pigments. According to the in U.S. Environmental Protection Agency, filters with a MERV value of 7 to 12 are just as effective as true HEPA filters at removing most airborne particles.

It is important to keep in mind that a higher rating does not automatically mean better performance. As MERV values rise, the pores within the air filter shrink in size. This generates more resistance to air flow. This can cause an HVAC system that is not designed for that particular filter to work harder. Not only can this potentially damage the HVAC system, but it also degrades indoor air quality due to the reduction of airflow through the filter. For this reason, the National Air Filtration Association recommends filters rated at MERV 9 to 12 for residential systems. In the present case, the MERV value of 11 is achieved by the polyurethane foam material of the body 42 of the filter 40 and provides an optimum particle retaining capability while reducing strain and resistance on the HVAC system of the vehicle.

Figure 1:
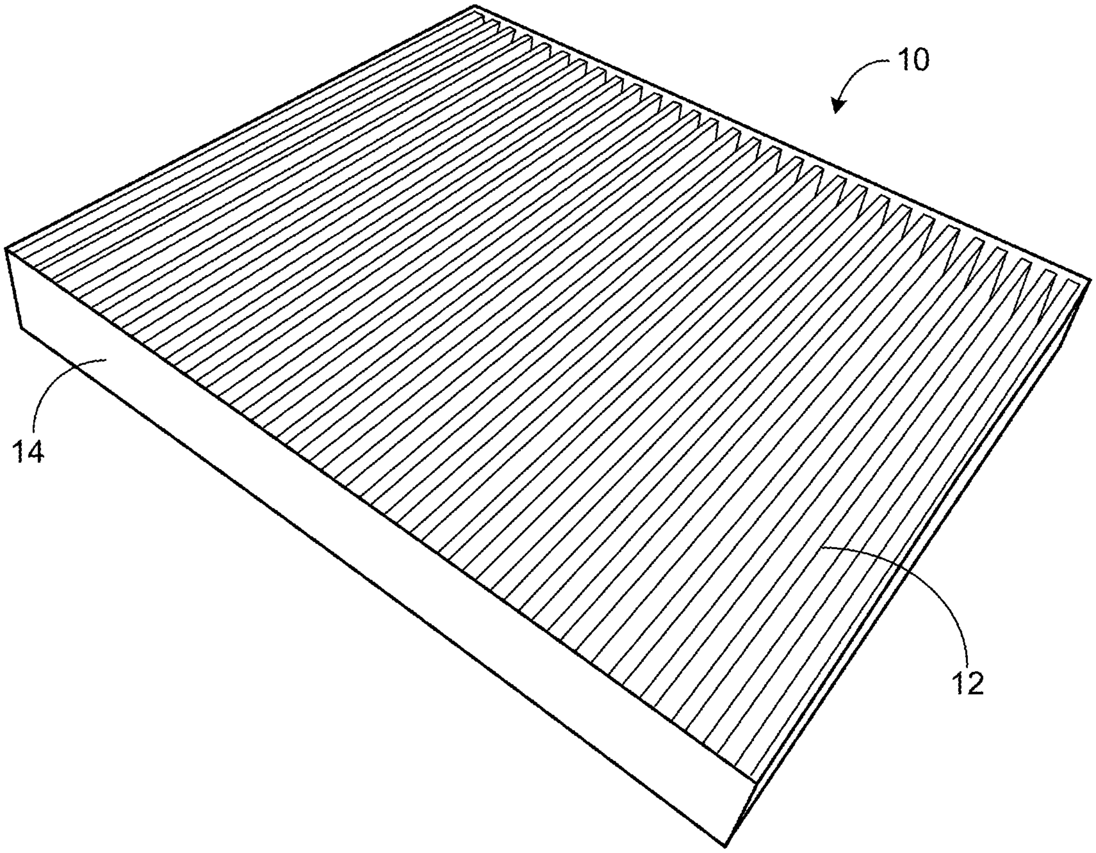
FIG. 1 PRIOR ART
FIG. 1 is a an upper perspective view showing a prior art pleated air filter.
Figure 2:
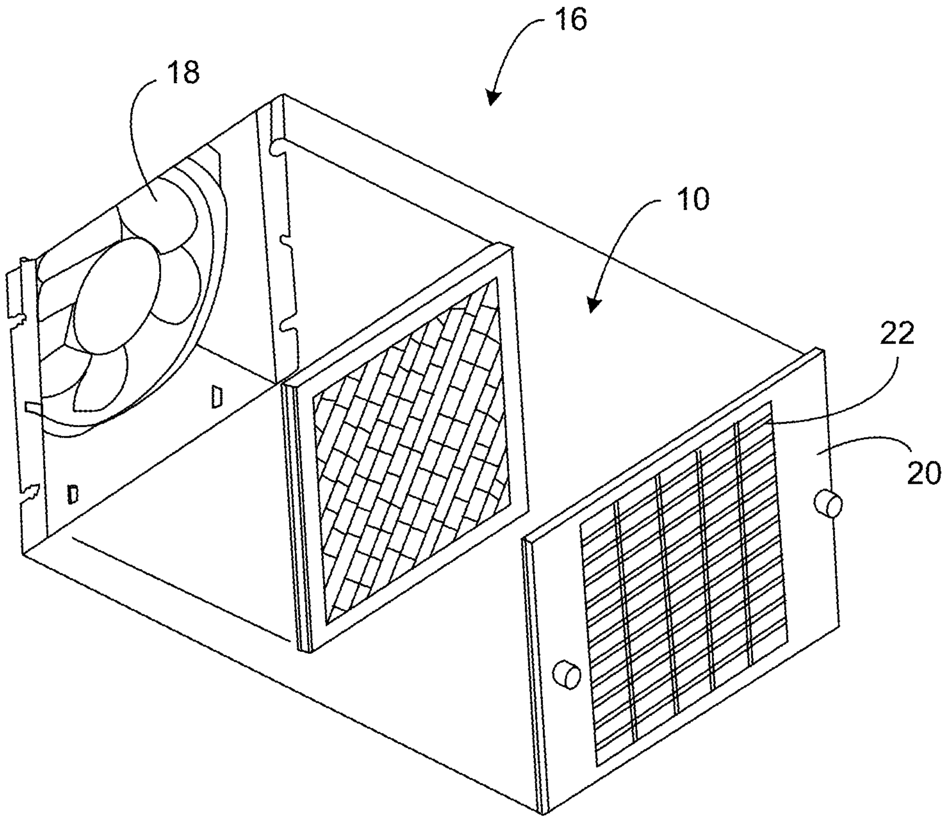
FIG. 2 PRIOR ART
FIG. 2 is a perspective view showing the installation of the prior art air filter into an HVAC system.

The filter 40 of the present invention greatly enhances the ability for suppliers to supply such air filters for a wide variety of vehicles. It is not necessary for the supplier to carry a wide variety and large number of sizes of such air filters. Since the present invention lacks the frame associated with existing pleated filters, the storage and shipment can be carried out in a relatively easy and efficient manner by simply compressing the filter and stacking the filters. When a particular size is required, all that is necessary is for the supplier to simply remove those cubical members from the body until the proper size is achieved. The present invention provides ease of installation by virtue of the fact that there are no tools required such as scissors, measuring devices, knives or other cutting devices. Since the filter of the present invention is compressible, minor variations in the size requirements and in the size provided by the supplier will not significantly impede the ability to supply the filter nor impede the ability for the filter to carry out its desired filtering operations. The filter of the present invention has a relatively long life when compared to the pleated paper filters of the prior art (as shown in FIG. 1). The filter of the present invention is relatively inexpensive. Since it is extremely easy to install, the cost associated with installation are significantly reduced.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

The invention claimed is:

1. A filter adaptable for use in an HVAC system, the filter comprising:

a body formed entirely of an air-transmissive open-cell polymeric material, said body having a generally rectangular configuration, said body having a top and a bottom and a front and a back and sides, said body having a plurality of cuts extending entirely through a thickness thereof from the top to the bottom, the plurality of cuts defining a plurality of cubical members frangibly connected together such that each of the plurality of cubical members is separable by hand from a remainder of said body such that an individual cubical member of the plurality of cubical members is removable along both of a portion of a length and a portion of a width of said body.

2. The filter of claim 1, the plurality of cubical members being connected by a segment of the air-transmissive open-cell polymeric material.

3. The filter of claim 1, the air-transmissive open-cell polymeric material being selected from the group consisting of foamed polyurethane, foamed polyether and foamed polyester.

4. The filter of claim 3, the air-transmissive open-cell polymeric material being open-cell foam polyurethane.

5. The filter of claim 1, the top being planar and in parallel relationship to the bottom, the sides being planar and in parallel relation to each other, the front being planar and in parallel relation to the back.

6. The filter of claim 1, each of the plurality of cubical members having sides of approximately one inch square area.

7. The filter of claim 1, wherein the length is twenty-five inches and the width is twenty-five inches and the thickness is one inch.

8. The filter of claim 1, wherein said body is flexible and compressible.

9. The filter of claim 1, wherein said body has no frame around the perimeter thereof and no support surface on either the top or the bottom thereof.

10. A filter for an HVAC system, the filter comprising:

a body formed entirely of an air-transmissive material, said body being of a generally rectangular configuration, said body having a top and a bottom and a front and a back and sides, said body having a plurality of cuts extending entirely through a thickness thereof from the top to the bottom, the plurality of cuts defining a plurality of cubical members frangibly connected together, said body having no frame around the periphery thereof and no support surface on either the top or the bottom thereof, the plurality of cuts extending lengthwise and widthwise across said body such that an individual cubical member of the plurality of cubical members is removable along both of a portion of a length that a portion of a width of said body.

11. The filter of claim 10, said body being flexible and compressible.

12. The filter of claim 10, wherein the individual cubical member is separable by hand from a remainder of said body.

13. The filter of claim 10, wherein the air-transmissive material is foamed polyurethane.

14. The filter of claim 10, wherein each of the individual cubical members is a one inch cube.

15. A method of installing a filter into an HVAC system, the method comprising:

removing an existing filter from the HVAC system;

forming a body entirely of an air-transmissive open-cell polymeric material having a plurality of cubical members frangibly connected together, the step of forming comprising:

cutting slits entirely through the body such that the plurality of cubical members are frangibly connected together, the cut slits extending lengthwise across the body and widthwise across the body such that an individual cubical member of the plurality of cubical members is separable along both a portion of a length and a portion of a width of said body so as to form the plurality of cubical members;

hand separating some of the plurality of cubical members from the remainder of the body until the body is of a size no less than the size of the existing filter; and inserting the body with a size no less than the size of the existing filter into the HVAC system.

16. The method of claim 15, the separate step of separating comprising:

breaking some of the plurality of cubical members by hand from adjacent cubical members until the body has a size approximating the existing filter.

17. The method of claim 15, further comprising:

after cutting the slits, laying the body over the removed existing filter, the step of separating comprising:

removing some of the plurality of cubical members until the body has a length and a width approximating a length and a width of the removed existing filter.

18. The method of claim 15, the body being formed of open-cell polyurethane material.

19. The method of claim 15, the body having no frame around the periphery thereof nor any support surface on either a top or a bottom thereof.

20. The method of claim 15, the body having a thickness equal to a thickness of the removed existing filter.

* * * * *